(12) United States Patent
Ioannou et al.

(10) Patent No.: US 10,019,409 B2
(45) Date of Patent: Jul. 10, 2018

(54) EXTENDING REMOTE DIRECT MEMORY ACCESS OPERATIONS FOR STORAGE CLASS MEMORY ACCESS

(71) Applicant: International Business Machines Corporation, Armonk, NY (US)

(72) Inventors: Nikolas Ioannou, Zurich (CH); Bernard Metzler, Zurich (CH); Jonas A. Pfefferle, Fällanden (CH); Patrick M. Stuedi, Zurich (CH); Animesh K. Trivedi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 14/816,202

(22) Filed: Aug. 3, 2015

(65) Prior Publication Data
US 2017/0039164 A1 Feb. 9, 2017

(51) Int. Cl.
*G06F 15/167* (2006.01)
*G06F 15/173* (2006.01)
*G06F 13/00* (2006.01)
*G06F 13/28* (2006.01)

(52) U.S. Cl.
CPC ........ *G06F 15/17331* (2013.01); *G06F 13/00* (2013.01); *G06F 13/28* (2013.01)

(58) Field of Classification Search
USPC .................. 709/212–217; 711/100, 114, 103
See application file for complete search history.

(56) References Cited

U.S. PATENT DOCUMENTS

| | | | |
|---|---|---|---|
| 8,577,986 B2 | 11/2013 | Pinkerton et al. | |
| 8,775,718 B2 | 7/2014 | Kanevsky et al. | |
| 8,909,727 B2 | 12/2014 | Frey et al. | |
| 2010/0083247 A1 | 4/2010 | Kanevsky et al. | |
| 2010/0146068 A1* | 6/2010 | Haviv | G06F 3/0613 709/212 |
| 2014/0032696 A1 | 1/2014 | Pinkerton et al. | |
| 2014/0129664 A1 | 5/2014 | McDaniel et al. | |
| 2014/0317219 A1 | 10/2014 | Fitch et al. | |
| 2014/0317336 A1 | 10/2014 | Fitch et al. | |
| 2016/0170910 A1* | 6/2016 | Inamdar | G06F 12/1475 711/163 |

FOREIGN PATENT DOCUMENTS

| | | |
|---|---|---|
| WO | 2009143381 A2 | 11/2009 |
| WO | 2009143381 A3 | 11/2009 |

\* cited by examiner

*Primary Examiner* — Oscar Louie
*Assistant Examiner* — Da T Ton
(74) *Attorney, Agent, or Firm* — Alexa L. Ashworth; A. Imtiaz Billah

(57) ABSTRACT

Embodiments of the present invention provide systems and methods for extending the remote direct memory access (RDMA) operations for accessing data from storage class memory (SCM). The method includes receiving an RDMA request in a first semantic, to a memory in a second semantic. The RDMA request in the first semantic is encoded, by encoding a type of the RDMA request into a memory area identifier, which includes an 8-bit key used to define additional storage semantics for the RDMA operation.

20 Claims, 3 Drawing Sheets

EXTENDING REMOTE DIRECT MEMORY ACCESS OPERATIONS FOR STORAGE CLASS MEMORY ACCESS

BACKGROUND OF THE INVENTION

The present invention relates generally to the field of remote direct memory access (RDMA), and more particularly to extending RDMA operations for storage class memory (SCM) access.

Remote direct memory access (RDMA) is networking technology for providing high-bandwidth, low-latency input and output (I/O) for data stored in dynamic random access memory (DRAM) buffers. Data in DRAM may be limited by its capacity, cost, and reduced durability. Storage class memories (SCM) are increasing in use, as they may fill in the demand for high performance storage. SCM storages are often faster, cheaper, and denser than the DRAM solutions. Current RDMA specifications are defined for accessing data from DRAM buffers.

SUMMARY

According to one embodiment of the present invention, a method for providing a remote direct memory access (RDMA) to a memory is provided, the method comprising: receiving, in a first semantic, an RDMA request to a memory in a second semantic; and encoding, in the first semantic, the RDMA request, by encoding a type of the RDMA request into a memory area identifier used for identifying areas of the memory.

According to another embodiment of the present invention, a computer program product for providing a remote direct memory access (RDMA) to a memory is provided, the computer program product comprising: a computer readable storage medium and program instructions stored on the computer readable storage medium, the program instructions comprising: program instructions to receive, in a first semantic, an RDMA request to a memory in a second semantic; and program instructions to encode, in the first semantic, the RDMA request, by encoding a type of the RDMA request into a memory area identifier used for identifying areas of the memory.

According to another embodiment of the present invention, a system for providing a remote direct memory access (RDMA) to a memory is provided, the system comprising: a memory, and a device configured to provide a remote direct memory access (RDMA) to the memory, the device comprising: a receiving unit, configure to receive an RDMA request in a first semantic, to a memory in a second semantic; and an encoding unit, configured to encode the RDMA request in the first semantic by encoding a type of the RDMA request into a memory area identifier, configured to identify areas of the memory.

DETAILED DESCRIPTION

Remote direct memory access (RDMA) is a key technology for providing high-bandwidth, low-latency input and output (I/O) for data stored in dynamic random access memory (DRAM) buffers. Data in DRAM may be limited by its capacity, cost, and reduced durability. Storage class memories (SCMs) are increasing in use, as they may fill in the demand for high performance storage. SCM storages are often faster, cheaper, and denser than the DRAM solutions. Current RDMA specifications are defined for accessing data from DRAM buffers. Embodiments of the present invention provide systems and methods for extending the RDMA operations for accessing data from SCM, by encoding application driven instructions for extensions within the RDMA operation structure.

Figure 1:
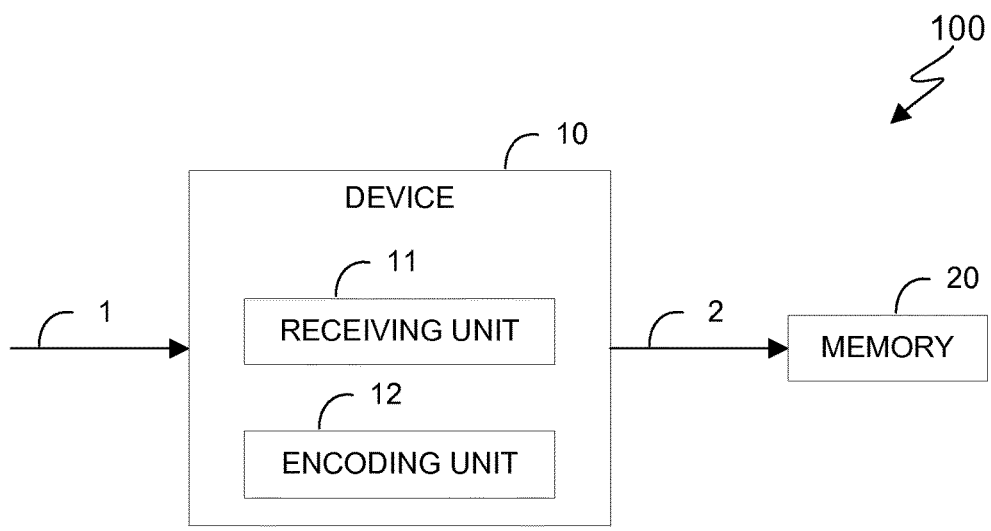
FIG. 1 depicts a block diagram illustrating an embodiment of a system for providing remote direct memory access to a memory, in accordance with an embodiment of the present invention.

The present invention will now be described in detail with reference to the Figures. FIG. 1 depicts a block diagram illustrating an embodiment of a system 100 comprising a device 10 for providing remote direct memory access to a memory 20, in accordance with an embodiment of the present invention. Modifications to system 100 may be made by those skilled in the art without departing from the scope of the invention as recited by the claims.

Figure 3:
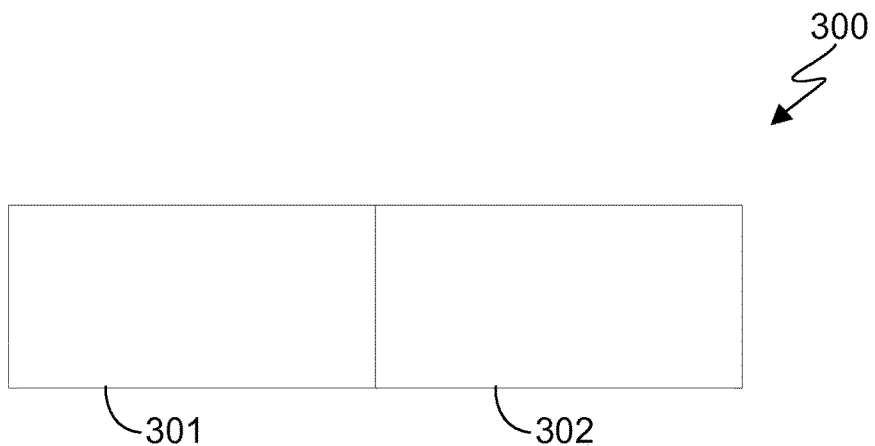
FIG. 3 depicts an embodiment of a memory area identifier used by the system of FIGS. 1 and 2, in accordance with an embodiment of the present invention.

Device 10 comprises a receiving unit 11 for receiving a remote direct memory access (RDMA) request 1 in a first semantic to the memory 20 which uses a second semantic. Device 10 further comprises an encoding unit 12 for encoding the RDMA request 1 in the first semantic. For encoding the RDMA request 1, a memory area identifier 2 (an example of which is shown in FIG. 3 as Steering Tag 300) is used. In this exemplary embodiment, memory area identifier 2 is used for identifying areas of the memory 20. Some bits of memory area identifier 2 are used for encoding a type of the RDMA request 1.

The respective unit or entity, e.g., receiving unit 11 or encoding unit 12, may be implemented in hardware and/or in software. If said unit is implemented in hardware, it may be embodied as a device, e.g., as a processor or as a part of a system (for example, a computer system). If said unit is implemented in software, it may be embodied as a computer program product, as a function, as a routine, as a program code or as an executable object.

According to device 10, RDMA operations can be used and are extended for accessing data from storage class memory (SCM), i.e., memory 20. These extensions are application driven and are encoded in the RDMA operation structure.

RDMA is a networking technology that offers high-bandwidth, low-latency, and zero-copy data transfers by avoiding CPU/OS related overheads. However, the standard RDMA specification is only defined for DRAM-to-DRAM data transfers. Data stored in DRAM buffers may be limited by the DRAM's capacity, non-durability, and the associated costs.

Storage class memories (SCMs) are constantly growing to fill the demand for high performance storage. SCMs provide faster performance than HDDs, a high-capacity, and SCMs can be densely packed. In addition, SCMs may be cheaper and more energy efficient than DRAM memories. Unlike DRAM, input and output (I/O) to SCM storage can be done in multiple ways using different semantics. Examples of which (not limiting to) are: synchronous and asynchronous writes to a SCM storage area, synchronous and asynchronous reads into a SCM storage area, and non-temporal or direct I/0 from SCM storage, which does not pollute the cache by keeping data in the cache.

Figure 2:
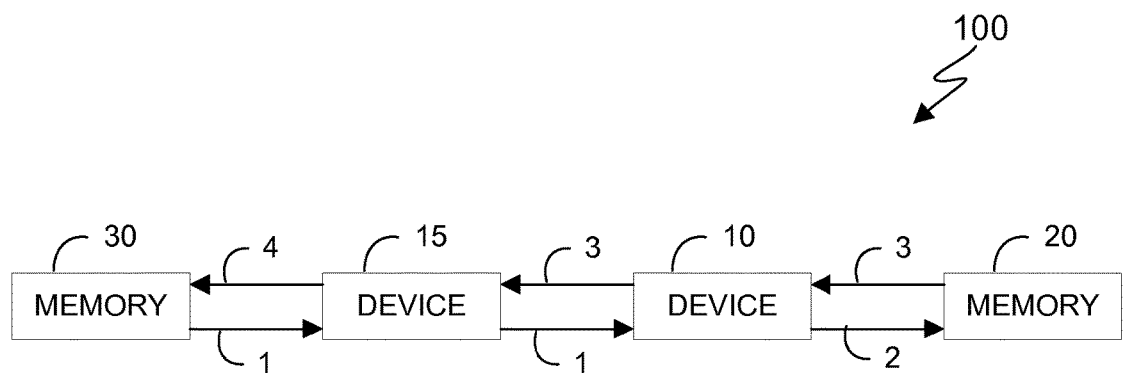
FIG. 2 depicts a further embodiment of a system for providing a remote direct memory access to a memory, in accordance with an embodiment of the present invention.

Device 10 will now be described in greater detail with reference to FIGS. 1 to 3. FIG. 1 shows system 100 comprising memory 20, which may be, for example, an SCM or flash memory, and device 10. FIG. 2 shows system 100 additionally comprising a second memory 30, which may be, for example, a DRAM, and a second device 15. FIG. 3 shows an example of memory area identifier 2 as a Steering Tag (STag) 300.

Using device 10, RDMA operations can be enhanced by encoding additional storage semantics into an RDMA operation. An RDMA operation includes an address, length, and a memory area identifier 2 (STag 300 ), as shown, for example, in FIG. 3. Memory area identifier 2 may also be called STag 300.

STag 300 may be a part of any RDMA operation to identify remote areas. In this exemplary embodiment, STag 300 comprises index 302 (provided by the RDMA network interface card) and a key 301 (provided by an application). In the current implementation of an RDMA framework, STag 300 is a 32 bit (24 bits index+8 bit key) identifier. The storage semantics are encoded by device 10 into those application-defined, 8-bits key 301. An RDMA device, which has the capability to access SCM storage, may deliver, order, or generate completion notifications based upon the desired encoded behavior from the application.

In this exemplary embodiment, for the current implementation of STag 300, the application-defined 8-bits key 301 can be used to define 256 possible operations. The 8-bits are interpreted by the RDMA network interface card (RNIC) to perform additional operations. For example, the RDMA framework can define:

define RDMA_SYNC (0x01)
define RDMA_ASYNC (0x02)

On the sink-side of an RDMA operation, which are write buffer for RDMA write, read sink for RDMA read, and receive buffer for receive, the application can achieve the desired I/O behavior by augmenting these user-defined 8-bits.

Device 10 may be an RNIC or may be integrated into such an RNIC. When receiving an RDMA request 1, which may include a management request, a read request, and/or a write request, device 10 can determine whether the RDMA request 1 is in a first semantic, and whether the memory 20 to which access is requested is in a second semantic. This may be the case when the RDMA request 1 comes from memory 30 (a DRAM), and memory 20 is an SCM.

Encoding unit 12 encodes RDMA request 1 into the STag 300 using key 301, which is associated with the application information. Memory area identifier 2, for example in the form of STag 300, is then forwarded to memory 20. When encoding RDMA request 1, the type of RDMA request 1 is encoded into memory area identifier 2 (i.e., STag 300). This means that an association between the semantic of RDMA request 1 and the semantic of memory 20 is integrated into STag 300.

As the type of the RDMA request 1 is encoded into STag 300, memory 20 can understand RDMA request 1. This also occurs when the semantic of RDMA request 1 and memory 20 are different, as is the case between DRAM and SCM devices. The encoding depends on the application and can be done in different ways.

RDMA request 1 may include any kind of storage access operation or storage management operation, like trimming of memory 20.

As depicted in FIG. 2, RDMA request 3 can also start from memory 20, to memory 30. In this case, the semantic of memory 20 may be encoded by device 10 into the semantic of memory 30, by encoding the type of the RDMA request 3 into an STag 4.

Figure 4:
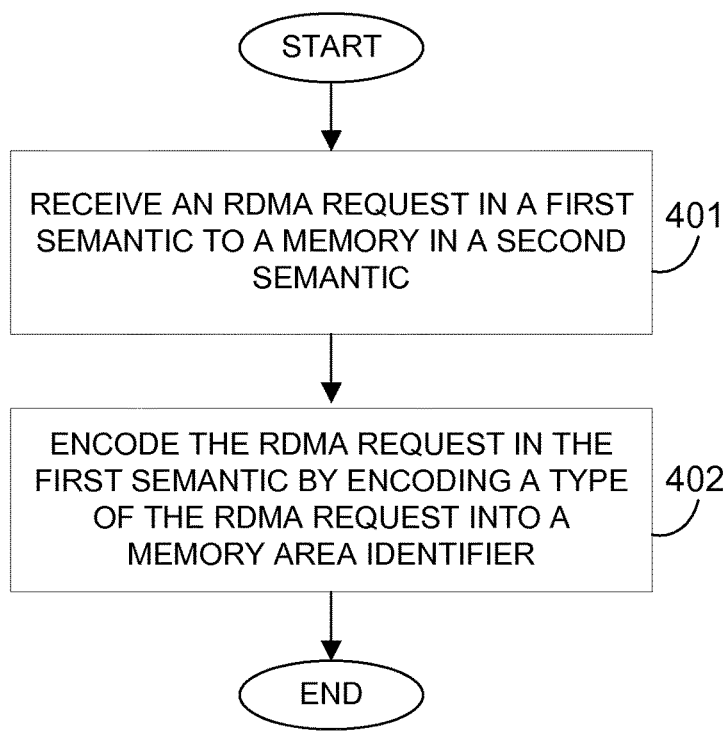
FIG. 4 depicts a flowchart illustrating operational steps for providing a remote direct memory access to a memory, in accordance with an illustrative embodiment of the present invention.

FIG. 4 depicts a flowchart illustrating operational steps for providing a remote direct memory access to memory 20, in accordance with an illustrative embodiment of the present invention.

In step 401, an RDMA request 1 is received in a first semantic to memory 20 in a second semantic.

In step 402, the remote direct memory access request 1 in the first semantic is encoded, by encoding a type of the RDMA request 1 into a memory area identifier 2, used for identifying areas of the memory 20. For example, a synchronous/asynchronous RDMA write to SCM storage may be:

```
struct ibv_sge rdma_io_sge;
struct ibv_send_wr rdma_io_wr;
/* local DRAM buffer */
rdma_io_sge.addr = dram_address;
rdma_io_sge.length = dram_length;
rdma_io_sge.lkey = dram_stag;
/* Scatter-gather list */
rdma_io_wr.sg_list = &rdma_io_sge;
rdma_io_wr.num_sge = 1;
/* remote SCM storage information */
if (io_type = ASYNC) {
rdma_io_wr.wr.rdma.rkey = scm_remote_stag | RDMA_ASYNC;
} else {
rdma_io_wr.wr.rdma.rkey = scm_remote_stag | RDMA_SYNC;
}
rdma_io_wr.wr.rdma.remote_addr = remote_scm_address;
/* RDMA operation type */
rdma_io_wr.opcode = IBV_RDMA_WRITE;
/* post the request */
ret = ibv_post_send(qp, rdma_io_wr, &rdma_io_wr_bad);
```

In this write, the command "if (io_type=ASYNC) Irdma_io_wr.wr.rdma.rkey=scm_remote_stag|RDMA_ASYNC;}" is the storage semantic augmentation.

In another example, a synchronous/asynchronous RDMA read into the SCM storage may be:

```
struct ibv_sge rdma_io_sge;
struct ibv_send_wr rdma_io_wr;
/* local SCM storage */
rdma_io_sge.addr = scm_address;
rdma_io_sge.length = scm_length;
if (io_type = ASYNC) {
rdma_io_sge.lkey = scm_stag | RDMA_ASYNC;
} else {
rdma_io_sge.lkey = scm_stag | RDMA_SYNC;
}
/* Scatter-gather list */
rdma_io_wr.sg_list = &rdma_io_sge;
rdma_io_wr.num_sge = 1;
/* Remote DRAM address */
rdma_io_wr.wr.rdma.remote_addr = remote_dram_address;
rdma_io_wr.wr.rdma.rkey = remote_dram_stag;
```

-continued

```
/* RDMA operation type */
rdma_io_wr.opcode = IBV_RDMA_READ;
/* post the request */
ret = ibv_post_send(qp, rdma_io_wr, &rdma_io_wr_bad);
```

In this read, the command "rdma_io_sge.lkey=scm_stag|RDMA_SYNC;" is the storage semantic augmentation.

Figure 5:
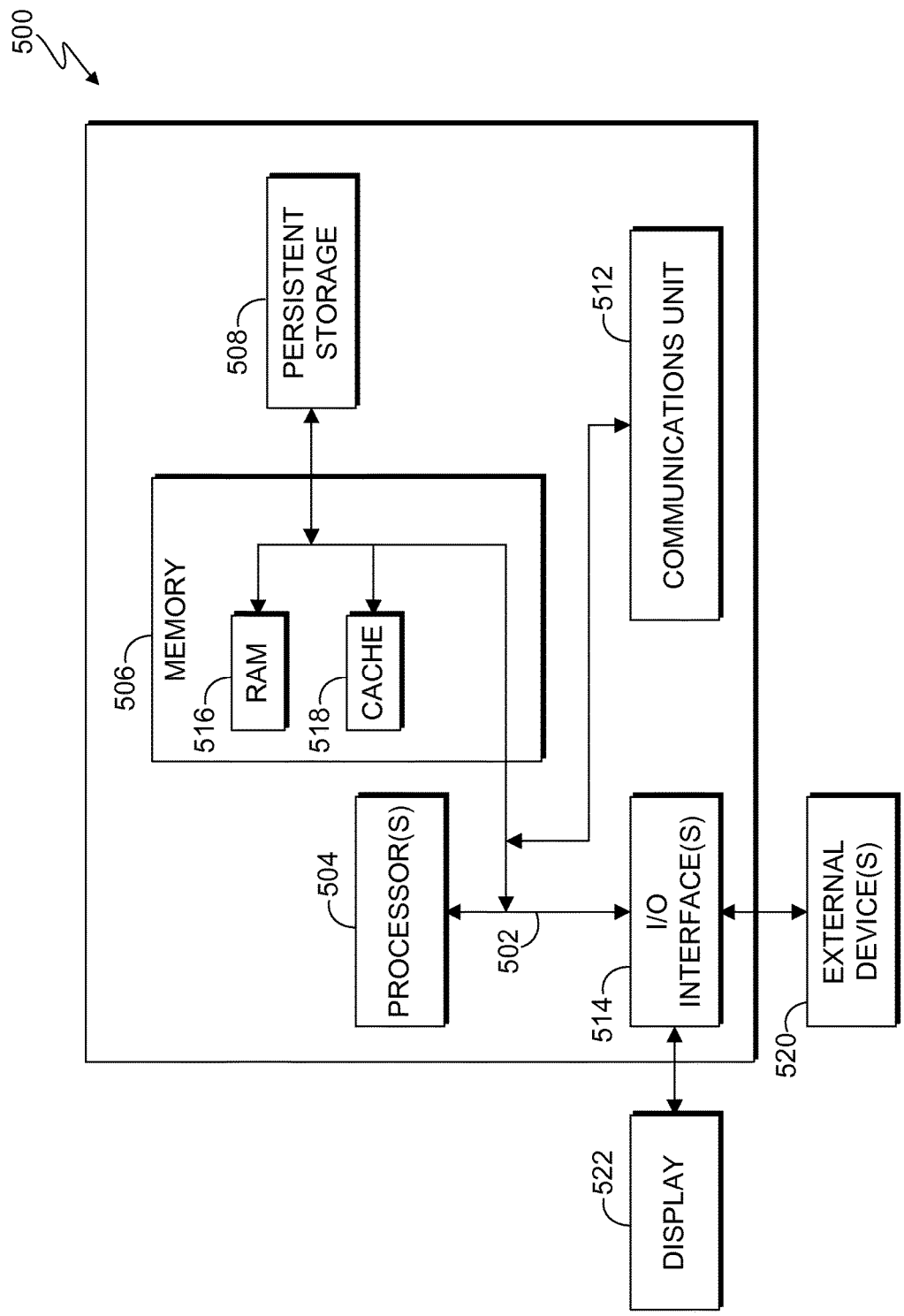
FIG. 5 depicts a block diagram of internal and external components of a computer system, in accordance with an embodiment of the present invention.

FIG. 5 depicts a block diagram of computer system 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media.

Program files are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. Applications and/or programs may be downloaded to persistent storage 508 through communications unit 512.

I/O interface(s) 514 allows for input and output of data with other devices that may be connected to computer system 500. For example, I/O interface 514 may provide a connection to external device(s) 520 such as a keyboard, keypad, a touch screen, and/or some other suitable input device. External device(s) 520 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 514. I/O interface(s) 514 also connect to a display 522.

Display 522 provides a mechanism to display data to a user and may be, for example, a computer monitor or an incorporated display screen, such as is used in tablet computers and smart phones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a remote direct memory access (RDMA) to a memory, the method comprising:
    receiving, in a first semantic, an RDMA request to a memory in a second semantic;
    encoding, in the first semantic, the RDMA request, by encoding a type of the RDMA request into a memory area identifier used for identifying areas of the memory, wherein the memory area identifier is based on an index and a key, wherein the index has a number of bits, and wherein the key has a number of bits;
    processing the RDMA request based on a number of bits of the memory area identifier, wherein the number of bits of the identifier derive from the number of bits of the index and the number of bits of the key;
    responsive to processing the RDMA request, augmenting: (i) a number of possible operations based on the number of bits of the key, and (ii) storage of the first semantic and the second semantic, and
    responsive to encoding the RDMA request, forwarding the memory area identifier to the memory.

2. The method of claim 1, wherein the memory comprises at least one of: a storage class memory (SCM) and a flash memory.

3. The method of claim 1, wherein the RDMA request comprises at least one of: a management request, a read request, and a write request.

4. The method of claim 1, wherein the key of the memory area identifier encodes a type of the RDMA request to a storage class memory (SCM).

5. The method of claim 1, wherein the type of the RDMA request is defined for at least one RDMA operation and at least one RDMA management operation.

6. The method of claim 4, wherein the memory area identifier comprises the key, and wherein the key is defined by an application.

7. A non-transitory computer program product for providing a remote direct memory access (RDMA) to a memory, the computer program product comprising:
    a non-transitory computer readable storage medium and program instructions stored on the computer readable storage medium, the program instructions comprising:
    program instructions to receive, in a first semantic, an RDMA request to a memory in a second semantic;
    program instructions to encode, in the first semantic, the RDMA request, by encoding a type of the RDMA request into a memory area identifier used for identifying areas of the memory, wherein the memory area identifier is based on an index and a key, wherein the index has a number of bits and wherein the key has a number of bits;

program instructions to process the RDMA request based on a number of bits of the memory area identifier, wherein the numbers of bits of the identifier derive from the number of bits of the index and the number of bits of the key;

responsive to processing the RDMA request, program instructions to augment: (i) a number of possible operations based of the number of bits of the key, and (ii) storage of the first semantic and the second semantic; and responsive to encoding the RDMA request, program instructions to forward the memory area identifier to the memory.

8. The non-transitory computer program product of claim 7, wherein the memory comprises at least one of: a storage class memory (SCM) and a flash memory.

9. The non-transitory computer program product of claim 7, wherein the RDMA request comprises at least one of: a management request, a read request, and a write request.

10. The non-transitory computer program product of claim 7, wherein the key of the memory area identifier encodes a type of the RDMA request to a storage class memory (SCM).

11. The non-transitory computer program product of claim 7, wherein the type of the RDMA request is defined for at least one RDMA operation and at least one RDMA management operation.

12. The non-transitory computer program product of claim 10, wherein the memory area identifier comprises the key, and wherein the key is defined by an application.

13. A system for providing a remote direct memory access to a memory, the system comprising:

a memory, and a device configured to provide a remote direct memory access (RDMA) to the memory, the device comprising:

a receiving unit configured to receive an RDMA request in a first semantic to a memory in a second semantic;

an encoding unit configured to encode the RDMA request in the first semantic by encoding a type of the RDMA request into a memory area identifier, configured to identify areas of the memory, wherein the memory area identifier is based on an index and a key, wherein the index has number of bits and the key has a number of bits;

program instructions to process the RDMA request based on a number of bits of the identifier, wherein the number of bits of the identifier derive from the number of bits of the index and the number of bits of the key;

responsive to processing the RDMA request, program instructions to augment:(i) a number of possible operations based of the number of bits of the key, and (ii) storage of the first semantic and the second semantic; and responsive to encoding the RDMA request, program instructions to forward the memory area identifier to the memory.

14. The system of claim 13, wherein the memory comprises at least one of: a storage class memory (SCM) and a flash memory.

15. The system of claim 13, wherein the RDMA request comprises at least one of: a management request, a read request, and a write request.

16. The system of claim 13, wherein the key is configured to encode the type of the RDMA request to a storage class memory (SCM).

17. The system of claim 13, wherein the type of the RDMA request is configured for at least one RDMA operation and at least one RDMA management operation.

18. The system of claim 16, wherein the memory area identifier comprises the key, and wherein the key is defined by an application.

19. The system of claim 13, wherein the memory area identifier comprises an RDMA based memory area identifier.

20. The system of claim 13, wherein the memory area identifier comprises a steering tag.

* * * * *